(12) United States Patent
Metivier et al.

(10) Patent No.: US 10,215,550 B2
(45) Date of Patent: Feb. 26, 2019

(54) METHODS AND APPARATUS FOR MAGNETIC SENSORS HAVING HIGHLY UNIFORM MAGNETIC FIELDS

(75) Inventors: Ryan Metivier, Nashua, NH (US); William P. Taylor, Amherst, NH (US)

(73) Assignee: ALLEGRO MICROSYSTEMS, LLC, Manchester, NH (US)

(*) Notice: Subject to any disclaimer, the term of this patent is extended or adjusted under 35 U.S.C. 154(b) by 848 days.

(21) Appl. No.: 13/461,164

(22) Filed: May 1, 2012

(65) Prior Publication Data

US 2013/0293220 A1 Nov. 7, 2013

(51) Int. Cl.
*G01B 7/30* (2006.01)

(52) U.S. Cl.
CPC ..................... *G01B 7/30* (2013.01)

(58) Field of Classification Search
None
See application file for complete search history.

(56) References Cited

U.S. PATENT DOCUMENTS

| | | |
|---|---|---|
| 3,195,043 A | 7/1965 | Burig et al. |
| 3,281,628 A | 10/1966 | Bauer et al. |
| 3,607,528 A | 9/1971 | Gassaway |
| 3,661,061 A | 5/1972 | Tokarz |
| 3,728,786 A | 4/1973 | Lucas et al. |
| 4,048,670 A | 9/1977 | Eysermans |
| 4,088,946 A * | 5/1978 | Charles et al. .......... 324/220 |
| 4,188,605 A | 2/1980 | Stout |
| 4,204,317 A | 5/1980 | Winn |
| 4,283,643 A | 8/1981 | Levin |
| 4,315,523 A | 2/1982 | Mahawili et al. |
| 4,573,258 A | 3/1986 | Io et al. |
| 4,614,111 A | 9/1986 | Wolff |
| 4,668,914 A | 5/1987 | Kersten et al. |
| 4,670,715 A | 6/1987 | Fuzzell |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,761,569 A | 8/1988 | Higgs |

(Continued)

FOREIGN PATENT DOCUMENTS

| | | |
|---|---|---|
| CH | 683 469 A5 | 3/1994 |
| DE | 103 14 602 A1 | 10/2004 |

(Continued)

OTHER PUBLICATIONS

Banjevic; "High Bandwidth CMOS Magnetic Sensors Based on the Miniaturized Circular Vertical Hall Device;" Sep. 2011; 153 pages.

(Continued)

*Primary Examiner* — Paresh H Patel
(74) *Attorney, Agent, or Firm* — Daly, Crowley Mofford & Durkee, LLP

(57) ABSTRACT

Methods and apparatus for a magnetic sensor including an elliptical magnet to generate substantially circular concentric zones of similar flux density in a plane over and parallel to a surface of the magnet. The sensor can include a sensing element disposed a selected distance from the magnet and a substrate containing circuitry to process a signal from the sensing element to provide a sensor output.

15 Claims, 8 Drawing Sheets

(56) References Cited

U.S. PATENT DOCUMENTS

| | | |
|---|---|---|
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,829,352 A | 5/1989 | Popovic et al. |
| 4,908,685 A | 3/1990 | Shibasaki et al. |
| 4,910,861 A | 3/1990 | Dohogne |
| 4,935,698 A | 6/1990 | Kawaji et al. |
| 4,983,916 A | 1/1991 | Iijima |
| 5,012,322 A | 4/1991 | Guillotte |
| 5,021,493 A | 6/1991 | Sandstrom |
| 5,028,868 A | 7/1991 | Murata et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,185,919 A | 2/1993 | Hickey |
| 5,196,794 A | 3/1993 | Murata |
| 5,210,493 A | 5/1993 | Schroeder et al. |
| 5,216,405 A | 6/1993 | Schroeder et al. |
| 5,247,202 A | 9/1993 | Popovic et al. |
| 5,250,925 A | 10/1993 | Shinkle |
| 5,286,426 A | 2/1994 | Rano, Jr. et al. |
| 5,289,344 A | 2/1994 | Gagnon et al. |
| 5,315,245 A | 5/1994 | Schroeder et al. |
| 5,332,965 A | 7/1994 | Wolf et al. |
| 5,414,355 A | 5/1995 | Davidson et al. |
| 5,434,105 A | 7/1995 | Liou |
| 5,442,283 A | 8/1995 | Vig et al. |
| 5,453,727 A | 9/1995 | Shibasaki et al. |
| 5,479,695 A | 1/1996 | Grader et al. |
| 5,488,294 A | 1/1996 | Liddell et al. |
| 5,491,633 A | 2/1996 | Henry et al. |
| 5,497,081 A | 3/1996 | Wolf et al. |
| 5,500,589 A | 3/1996 | Sumcad |
| 5,500,994 A | 3/1996 | Itaya |
| 5,508,611 A | 4/1996 | Schroeder et al. |
| 5,541,506 A | 7/1996 | Kawakita et al. |
| 5,551,146 A | 9/1996 | Kawabata et al. |
| 5,572,058 A | 11/1996 | Biard |
| 5,581,170 A | 12/1996 | Mammano et al. |
| 5,581,179 A | 12/1996 | Engel et al. |
| 5,612,618 A | 3/1997 | Arakawa |
| 5,619,137 A | 4/1997 | Vig et al. |
| 5,621,319 A | 4/1997 | Bilotti et al. |
| 5,627,315 A | 5/1997 | Figi et al. |
| 5,631,557 A | 5/1997 | Davidson |
| 5,657,189 A | 8/1997 | Sandhu |
| 5,691,637 A | 11/1997 | Oswald et al. |
| 5,694,038 A | 12/1997 | Moody et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,818,222 A | 10/1998 | Ramsden |
| 5,818,223 A | 10/1998 | Wolf |
| 5,831,513 A | 11/1998 | Lue |
| 5,839,185 A | 11/1998 | Smith et al. |
| 5,841,276 A | 11/1998 | Makino et al. |
| 5,844,411 A | 12/1998 | Vogt |
| 5,859,387 A | 1/1999 | Gagnon |
| 5,883,567 A | 3/1999 | Mullins, Jr. |
| 5,886,070 A | 3/1999 | Honkura et al. |
| 5,912,556 A | 6/1999 | Frazee et al. |
| 5,917,320 A | 6/1999 | Scheller et al. |
| 5,942,895 A | 8/1999 | Popovic et al. |
| 5,963,028 A | 10/1999 | Engel et al. |
| 6,016,055 A | 1/2000 | Jager et al. |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,136,250 A | 10/2000 | Brown |
| 6,166,535 A | 12/2000 | Irle et al. |
| 6,175,233 B1 | 1/2001 | McCurley et al. |
| 6,180,041 B1 | 1/2001 | Takizawa |
| 6,184,679 B1 | 2/2001 | Popovic et al. |
| 6,198,373 B1 | 3/2001 | Ogawa et al. |
| 6,232,768 B1 | 5/2001 | Moody et al. |
| 6,236,199 B1 | 5/2001 | Irle et al. |
| 6,265,864 B1 | 7/2001 | De Winter et al. |
| 6,265,865 B1 | 7/2001 | Engel et al. |
| 6,278,269 B1 | 8/2001 | Vig et al. |
| 6,288,533 B1 | 9/2001 | Haeberli et al. |
| 6,297,627 B1 | 10/2001 | Towne et al. |
| 6,356,068 B1 | 3/2002 | Steiner et al. |
| 6,356,741 B1 | 3/2002 | Bilotti et al. |
| 6,414,482 B1 | 7/2002 | Mase |
| 6,501,270 B1 | 12/2002 | Opie |
| 6,525,531 B2 | 2/2003 | Forrest et al. |
| 6,542,068 B1 | 4/2003 | Drapp et al. |
| 6,545,332 B2 | 4/2003 | Huang |
| 6,545,457 B2 | 4/2003 | Goto et al. |
| 6,545,462 B2 | 4/2003 | Schott et al. |
| 6,614,223 B2 | 9/2003 | Schroeder et al. |
| 6,622,012 B2 | 9/2003 | Bilotti et al. |
| 6,646,435 B1 | 11/2003 | Nakamura et al. |
| 6,692,676 B1 | 2/2004 | Vig et al. |
| 6,693,419 B2 | 2/2004 | Stauth et al. |
| 6,693,424 B2 | 2/2004 | Makino et al. |
| 6,768,301 B1 | 7/2004 | Hohe et al. |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,902,951 B2 | 6/2005 | Goller et al. |
| 6,956,366 B2 | 10/2005 | Butzmann |
| 6,969,988 B2 | 11/2005 | Kakuta et al. |
| 7,030,606 B2 | 4/2006 | Kato et al. |
| 7,031,170 B2 | 4/2006 | Daeche et al. |
| 7,038,448 B2 | 5/2006 | Schott et al. |
| 7,085,119 B2 | 8/2006 | Bilotti et al. |
| 7,119,538 B2 | 10/2006 | Blossfeld |
| 7,159,556 B2 | 1/2007 | Yoshihara |
| 7,164,263 B2 | 1/2007 | Yakymyshyn et al. |
| 7,193,412 B2 | 3/2007 | Freeman |
| 7,235,968 B2 | 6/2007 | Popovic et al. |
| 7,242,181 B2 | 7/2007 | Butzmann |
| 7,259,545 B2 | 8/2007 | Stauth et al. |
| 7,259,556 B2 | 8/2007 | Popovic et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,288,931 B2 | 10/2007 | Granig et al. |
| 7,307,824 B2 | 12/2007 | Bilotti et al. |
| 7,323,780 B2 | 1/2008 | Daubenspeck et al. |
| 7,358,719 B2 | 4/2008 | Kondo |
| 7,361,531 B2 | 4/2008 | Sharma et al. |
| 7,362,094 B2 | 4/2008 | Voisine et al. |
| 7,372,253 B2 | 5/2008 | Biber et al. |
| 7,375,510 B2 | 5/2008 | Miyata et al. |
| 7,385,394 B2 | 6/2008 | Auburger et al. |
| 7,408,344 B2 | 8/2008 | Tokuhara |
| 7,598,601 B2 | 1/2009 | Taylor et al. |
| 7,557,568 B2 | 7/2009 | Terasaki |
| 7,710,110 B2 | 5/2010 | Patil et al. |
| 7,714,570 B2 | 5/2010 | Thomas et al. |
| 7,746,065 B2 | 6/2010 | Pastre et al. |
| 7,759,929 B2 | 7/2010 | Forsyth |
| 7,816,905 B2 | 8/2010 | Doogue et al. |
| 7,791,334 B2 | 9/2010 | Fischer |
| 7,808,074 B2 | 10/2010 | Knittl |
| 7,816,772 B2 | 10/2010 | Engel et al. |
| 7,839,141 B2 | 11/2010 | Werth et al. |
| 7,872,322 B2 | 1/2011 | Schott et al. |
| 7,911,203 B2 | 3/2011 | Thomas et al. |
| 7,965,076 B2 | 6/2011 | Schott |

(56) References Cited

U.S. PATENT DOCUMENTS

| | | | |
|---|---|---|---|
| 7,994,774 B2 | 8/2011 | Thomas et al. | |
| 8,022,692 B2 | 9/2011 | Fernandez et al. | |
| 8,058,870 B2 | 11/2011 | Sterling | |
| 8,063,634 B2 | 11/2011 | Sauber et al. | |
| 8,143,169 B2 | 3/2012 | Engel et al. | |
| 8,324,891 B2* | 12/2012 | Kejik | G01R 33/07 324/207.11 |
| 2003/0132745 A1* | 7/2003 | Johnson | G01D 5/145 324/207.2 |
| 2004/0032251 A1 | 2/2004 | Zimmerman et al. | |
| 2004/0332251 | 2/2004 | Zimmerman et al. | |
| 2004/0046248 A1 | 3/2004 | Waelti et al. | |
| 2004/0080314 A1 | 4/2004 | Tsujii et al. | |
| 2004/0155644 A1 | 8/2004 | Stauth et al. | |
| 2004/0184196 A1 | 9/2004 | Jayasekara | |
| 2005/0167790 A1 | 8/2005 | Khor et al. | |
| 2005/0194967 A1* | 9/2005 | Godoy et al. | 324/207.2 |
| 2005/0280411 A1 | 12/2005 | Bicking | |
| 2006/0011999 A1 | 1/2006 | Schott et al. | |
| 2006/0033487 A1 | 2/2006 | Nagano et al. | |
| 2006/0068237 A1 | 3/2006 | Murphy | |
| 2006/0125473 A1 | 6/2006 | Frachon et al. | |
| 2006/0175674 A1 | 8/2006 | Taylor et al. | |
| 2006/0181263 A1 | 8/2006 | Doogue et al. | |
| 2006/0261801 A1 | 11/2006 | Busch | |
| 2007/0029998 A1 | 2/2007 | Popovic et al. | |
| 2007/0170533 A1 | 7/2007 | Doogue et al. | |
| 2008/0013298 A1 | 1/2008 | Sharma et al. | |
| 2008/0237818 A1 | 10/2008 | Engel et al. | |
| 2009/0121707 A1 | 5/2009 | Schott | |
| 2009/0140725 A1 | 6/2009 | Ausserlechner | |
| 2009/0152696 A1 | 6/2009 | Dimasacat et al. | |
| 2009/0174395 A1 | 7/2009 | Thomas et al. | |
| 2009/0315541 A1* | 12/2009 | Zak | 324/207.2 |
| 2010/0141249 A1 | 6/2010 | Ararao et al. | |
| 2010/0156397 A1 | 6/2010 | Yabusaki et al. | |
| 2010/0164491 A1 | 7/2010 | Kejik et al. | |
| 2010/0176803 A1* | 7/2010 | Ausserlechner | 324/207.25 |
| 2010/0188078 A1 | 7/2010 | Foletto et al. | |
| 2010/0201356 A1 | 8/2010 | Koller et al. | |
| 2010/0237450 A1 | 9/2010 | Doogue et al. | |
| 2010/0276769 A1 | 11/2010 | Theuss et al. | |
| 2010/0295140 A1 | 11/2010 | Theuss et al. | |
| 2010/0330708 A1 | 12/2010 | Engel et al. | |
| 2011/0248708 A1 | 10/2011 | Thomas et al. | |
| 2012/0013333 A1 | 1/2012 | Ararao et al. | |
| 2012/0086090 A1 | 4/2012 | Sharma et al. | |

FOREIGN PATENT DOCUMENTS

| | | | |
|---|---|---|---|
| DE | 10 2005 014 509 B4 | 10/2006 | |
| DE | 10 2006 037 226 A1 | 2/2008 | |
| DE | 10 2007 018 238 A1 | 10/2008 | |
| EP | 0 361 456 A2 | 4/1990 | |
| EP | 0 0631 416 B1 | 12/1994 | |
| EP | 0 680 103 A1 | 11/1995 | |
| EP | 0 875 733 B1 | 11/1998 | |
| EP | 0 898 180 | 2/1999 | |
| EP | 0 916 074 B1 | 5/1999 | |
| EP | 1 443 332 A1 | 8/2004 | |
| EP | 1571424 A1 * | 9/2005 | G01D 5/145 |
| EP | 2 000 814 A2 | 12/2008 | |
| FR | 2 748 105 | 10/1997 | |
| JP | 58-055688 A | 4/1983 | |
| JP | 363084176 A | 4/1988 | |
| JP | 63263782 | 10/1988 | |
| JP | 04 152688 | 5/1992 | |
| JP | 8097486 | 4/1996 | |
| JP | 9 166612 | 6/1997 | |
| JP | 11 074142 | 3/1999 | |
| JP | 2000 183241 A | 6/2000 | |
| JP | 2001 141738 A | 5/2001 | |
| JP | 2003-042709 | 2/2003 | |
| JP | 2003 177171 A | 6/2003 | |
| JP | 2004 356338 | 12/2004 | |
| JP | 2005-241269 | 9/2005 | |
| JP | 2010-014607 | 1/2010 | |
| JP | 2010-078366 | 4/2010 | |
| WO | WO 1998/010302 | 3/1998 | |
| WO | WO 1998/054547 | 12/1998 | |
| WO | WO 2000/002266 | 1/2000 | |
| WO | WO 2003/036732 A2 | 5/2003 | |
| WO | WO 03 107018 A1 | 12/2003 | |
| WO | WO 2004/025742 A1 | 3/2004 | |
| WO | WO 2004 027436 | 4/2004 | |
| WO | WO 2006/056289 A1 | 6/2006 | |
| WO | WO 2006/074989 A2 | 7/2006 | |
| WO | WO 2006 083479 | 8/2006 | |
| WO | WO 2008 008140 A2 | 1/2008 | |
| WO | WO 2008 008140 A3 | 1/2008 | |
| WO | WO 2008 121443 A1 | 10/2008 | |
| WO | WO 2008 145662 A1 | 12/2008 | |
| WO | WO 2008/145662 A1 | 12/2008 | |
| WO | WO 2009/124969 A1 | 10/2009 | |
| WO | WO 2010 065315 | 6/2010 | |

OTHER PUBLICATIONS

Drljaca, et al.; "Nonlinear Effects in Magnetic Angular Position Sensor With Integrated Flux Concentrator;" Proc. 23$^{rd}$ International Conference on Microelectronics (MIEL 2002); vol. 1; NIS; Yugoslavia; May 12-15, 2002; pp. 223-226.

Allegro Microsystems, Inc.; "High Precision Linear Hall Effect Sensor IC with a Push/Pull, Pulse Width Modulated Output;" A1351; pp. 1-23.

Allegro Microsystems, Inc.; "High Precision 2-Wire Linear Hall Effect Sensor IC with a Pulse Width Modulated Output;" A1354; pp. 1-22.

Allegro Microsystems, Inc.; "High Precision Linear Hall-Effect Sensor with an Open Drain Pulse Width Modulated Output;" A1356; pp. 1-20.

Allegro Microsystems, Inc.; "Low-Noise Programmable Linear Hall Effect Sensor ICs with Adjustable Bandwidth (50 kHz Maximum) and Analog Output;" A1360, A1361 and A1362; pp. 1-25.

Baschirotto et al.; "Development and Analysis of a PCB Vector 2-D Magnetic Field Sensor System for Electronic Compasses;" IEEE Sensors Journal, vol. 6, No. 2; Apr. 2006; pp. 365-371.

Kejik, et al.; "Purley CMOS Angular Position Sensor Based on a New Hall Microchip;" 34$^{th}$ Annual Conference of IEEE Industrial Electronics; IECON; Nov. 10-13, 2008; pp. 1777-1781.

Kejik,.et al.; "Ultra Low-Power Angular Position Sensor for High-Speed Portable Applications;" 2009 IEEE Sensors Conference; Oct. 25-28, 2009; pp. 173-176.

Reymond, et al.; "True 2D CMOS Integrated Hall Sensor;" 2007 IEEE Sensors Conference; Oct. 28-31, 2007; pp. 860-863.

Gerhauser; "Intelligente 3D-Magnetfeld Snesorik;" Fraunhofer-Institut for Integrierte Schaltungen IIS; www.iis.fraunhofer.de/asic/analog; Oct. 2009; 2 pages.

Melexis Microelectronic Integrated Systems; MLX90333; "Triaxis 3D-Joystick Position Sensor;" Data Sheet; Mar. 2009; 43 pages.

MEMSIC Corporation; AN-00MM-004; "Electronic Tilt Compensation;" Mar. 2008; 5 pages.

MEMSIC Corporation; AN-00MM-003; "Magnetic Sensor Calibration;" Mar. 2008; 5 pages.

MEMSIC Corporation; AN-00MM-002; "Magnetometer Soldering Methodology;" Jun. 2008; 2 pages.

MEMSIC Corporation; AN-00MM-001; "Magnetometer Fundamentals;" Jun. 2008; 6 pages.

MEMSIC Corporation; AN-00MM-005; "Magnetic Sensor Placement Guidelines;" Oct. 2008; 2 pages.

MEMSIC Corporation; MMC312xMQ; "Tri-axis Magnetic Sensor, with I$^2$C Interface;" Aug. 14, 2008; 9 pages.

MEMSIC Corporation; MMC314xMS; "Ultra Small 3-axis Magnetic Sensor, with I$^2$C Interface;" Mar. 31, 2010; 8 pages.

Micronas GmbH; "HAL® 3625 Programmable Direct Angle Sensor;" Product Information; Sep. 2009; 2 pages.

(56) References Cited

OTHER PUBLICATIONS

Allegro Microsystems, Inc.; "A1140/41/42/43 Data Sheet: Sensitive Two-Wire Chopper-Stabilized Unipolar Hall-Effect Switches;" published Sep. 9, 2004; pp. 1-11.
Allegro Microsystems, Inc.; "A1174 Data Sheet: Ultrasensitive Hall Effect Latch with Internally or Externally Controlled Sample and Sleep Periods for Track Ball and Scroll Wheel Applications;" published Jul. 25, 2008; pp. 1-13.
Allegro Microsystems, Inc.; "A1230 Data Sheet: Ultra-Sensitive Dual-Channel Quadrature Hall-Effect Bipolar Switch;" published Mar. 26, 2010; 16 sheets.
Allegro Microsystems, Inc.; "A1360, A1361 and A1362 Data Sheet: Low-Noise Programmable Linear Hall Effect Sensors with Adjustable Bandwidth (50 kHz Maximum) and Analog Output;" published Mar. 18, 2008; pp. 1-25.
Allegro Microsystems, Inc.; "A3212 Data Sheet: Micropower, Ultra-Sensitive Hall-Effect Switch;" published Sep. 22, 2004; pp. 1-12.
Allegro Microsystems, Inc.; "ATS675LSE Data Sheet: Self-Calibrating TPOS Speed Sensor Optimized for Automotive Cam Sensing Applications;" published Jul. 11, 2008; pp. 1-13.
Allegro Microsystems, Inc.; "27701-AN Data Sheet: Hall-Effect IC Applications Guide;" Application Information, Rev. 2; http://www.allegromicro.com/en/products/design/hall-effect-sensor-ic-applications-guide/AN27701.pdf; downloaded Sep. 29, 2010; pp. 1-40.
Allegro Microsystems, Inc.; "3235 Data Sheet 27633A, Dual-Output Hall-Effect Switch;" http://www.datasheetcatalog.org/datasheets/90/205047_DS.pdf; downloaded Sep. 29, 2010; 6 sheets.
Allegro Microsystems, Inc.; "A3425 Data Sheet: Dual, Chopper-Stabilized, Ultra-Sensitive Bipolar Hall-Effect Switch;" published Jun. 28, 2002; pp. 1-10.
Atherton et al.; "Sensor Signal Conditioning—an IC Designer's Perspective;" IEEE Electro International; Apr. 26-28, 1991; pp. 129-134.
Austria Microsystems; "AS5040 datasheet; 10-Bit Programmable Magnetic Rotary Encoder;" Revision 1.1; Jan. 2004; pp. 1-20.
Blanchard et al.; "Cylindrical Hall Device;" International Electron Devices Meeting; Dec. 8-11, 1996; pp. 541-544.
Burger et al.; "New fully integrated 3-D silicon Hall sensor for precise angular-position measurements;" Sensors and Actuators, A 67; May 1998; pp. 72-76.
Dwyer; Allegro Microsystems, Inc.; "AN296061 Data Sheet: Ring Magnet Speed Sensing for Electronic Power Steering;" published Jul. 21, 2009; pp. 1-4.
Freitas et al.; "Giant magnetoresistive sensors for rotational speed control;" Jorunal of Applied Physics, vol. 85, No. 8; Apr. 15, 1999; pp. 5459-5461.
Gilbert; "Technical Advances in Hall-Effect Sensing;" Allegro Microsystems, Inc. Product Description; May 10, 2008; 7 sheets.
Häberli et al.; "Contactless Angle Measurements by CMOS Magnetic Sensor with on Chip Read-Out Circuit;" The 8th International Conference on Solid-State Sensors and Actuators and Eurosensors IX; Jan. 25-29, 1995; pp. 134-137.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; pp. 1902-1907.
Hiligsmann et al.; "Monolithic 360 Degrees Rotary Position Sensor IC;" 2004 IEEE Proceedings of Sensors, vol. 3; Oct. 24-27, 2004; pp. 1137-1142.
Kejik et al.; "Circular Hall Transducer for Angular Position Sensing;" International Solid-State Sensors, Actuators and Microsystems Conference; Transducers; Jun. 2007; pp. 2593-2596.
Lou Law; "Angle Position Sensing with 2-Axis Hall ICs;" Sensors Magazine, vol. 20, No. 3; Mar. 2003; 7 sheets.
Masson et al.; "Multiturn and high precision through-shaft magnetic sensors;" Sensor + Text Conference; Proceedings II; May 2009; pp. 41-46.
Metz et al.; "Contactless Angle Measurement Using Four Hall Devices on Single Chip;"; International Conference on Solid State Sensors and Actuators; Transducers; vol. 1; Jun. 16-19, 1997; pp. 385-388.
Munter; "A Low-offset Spinning-current Hall Plate;" Sensors and Actuators, vol. A21-A23; Jan. 1990; pp. 743-746.
Novotechnik Siedle Group; "How New Angular Positioning Sensor Technology Opens a Broad Range of New Applications;" Vert-X Technology; Dec. 2001; pp. 1-5.
Paranjape et al.; "A CMOS-compatible 2-D vertical Hall magnetic-field sensor using active carrier confinement and post-process micromachining;" The 8th International Conference on Solid-State Sensors and Acutators, Physical vol. 53, Issues 1-3; May 1996; pp. 278-283.
Petoussis et al.; "A Novel Hall Effect Sensor Using Elaborate Offset Cancellation Method;" Sensors & Transducers Journal, vol. 100, Issue 1; Jan. 2009; pp. 85-91.
Popovic; "Not-plate-like Hall magnetic sensors and their applications;" Sensors and Actuators A: Physical, vol. 85, Issues 1-3; Aug. 2000; pp. 9-17.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; pp. 55-58.
Roumenin; "Magnetic sensors continue to advance towards perfection;" Sensors and Actuators A: Physical, vol. 46-47, Issues 1-3; Jan.-Feb. 1995; pp. 273-279.
Schneider et al.; "Temperature Calibration of CMOS Magnetic Vector Probe for Contactless Angle Measurement System;" International Electron Devices Meeting; Dec. 8-11, 1996; pp. 533-536.
SENSIMA technology sa; "CVHD: a new concept of Angular Position Sensor;" Slide Presentation for Allegro Microsystems; Mar. 2009; 17 sheets.
Sentron; AN-101; "Angular position sensing with 2-Axis Hall IC 2SA-10;" Feb. 12, 2004; http://www.diegm.uniud.it/petrella/Azionamenti%20Elettrici%20II/Sensori%20e%20trasduttori/Data%20Sheet%20-%202SA-10.pdf; pp. 1-7.
Van der Meer; et al; "CMOS quad spinning-current Hall-sensor system for compass application;" IEEE Proceedings of Sensors, vol. 3; Oct. 24-27, 2004; pp. 1434-1437.
Vogelgesang et al.; Robert Bosch GmbH; "GMR sensors in automotive application;" CS-SNS/ECS Slides Presentation; Mar. 2, 2005; 16 sheets.
Volder; "The CORDIC Trigonometric Computing Technique;" The Institute of Radio Engineers, Inc.; IRE Transactions on Electronic Computers, vol. EC, Issue 3; Sep. 1959; pp. 226-230.
Melexis MLX 90324; ""Under-the-Hood" Triaxis Rotary Position feat. SENT Protocol;" 3901090324 Data Sheet; Dec. 2008; 40 pages.
U.S. Appl. No. 12/360,889, filed Dec. 28, 2009, Foletto et al.
U.S. Appl. No. 13/241,380, filed Sep. 23, 2011, Ararao et al.
U.S. Appl. No. 13/350,970, filed Jan. 16, 2012, Milano, et al.
Allegro MicroSystems, Inc., "Two-Wire True Zero Speed Miniature Differential Peak-Detecting Gear Tooth Sensor," ATS645LSH; 2004; Allegro MicroSystems, Inc., Worcester, MA 01615; pp. 1-14.
Allegro MicroSystems, Inc., "True Zero-Speed Low-Jitter High Accuracy Gear Tooth Sensor;" ATS625LSG; 2005; Allegro MicroSystems, Inc, Worcester, MA 01615; pp. 1-21.
Allegro MicroSystems, Inc., "Gear-Tooth Sensor for Automotive Applications," Allegro Microsystems, Inc., Aug. 3, 2001, 2 pages.
Allegro MicroSystems, Inc., Hall-Effect IC Applications Guide, http://www.allegromicro.com/en/Products/Design/an/an27701.pdf, Copyright 1987, 1997, pp. 1-36.
Bowers et al., "Microfabrication and Process Integration of Powder-Based Permanent Magnets", Interdisciplinary Microsystems Group, Dept. Electrical and Computer Engineering, University of Florida, USA; Technologies for Future Micro-Nano Manufacturing Workshop, Napa, California, Aug. 8-10, 2011, pp. 162-165.
Chinese Office Action (w/English translation); dated Sep. 10, 2010; for Chinese Patent Application No. CH 2008 80008895.6, 14 pages.
Dwyer, "Back-Biased Packaging Advances (SE, SG & SH versus SA & SB)," http://www.allegromicro.com/en/Products/Design/packaging_advances/index.asp, Copyright 2008, pp. 1-5.

(56) References Cited

OTHER PUBLICATIONS

Honeywell International, Inc., "Hall Effect Sensing and Application," Micro Switch Sensing and Control, Chapter 3, http://content.honeywell.com/sensing/prodinfo/solidstate/technical/hallbook.pdf, date unavailable but believed to be before Jan. 2008, pp. 9-18.

Infineon Product Brief, TLE 4941plusC, Differential Hall IC for Wheel Speed Sensing, Oct. 2010, www.infineon.com/sensors, 2 pages.

Johnson et al., "Hybrid Hall Effect Device," Appl. Phys. Lett., vol. 71, No. 7, Aug. 1997, pp. 974-976.

Lagorce et al.; "Magnetic and Mechanical Properties of Micromachined Strontium Ferrite/Polyimide Composites;" Journal of Microelectromechanical Systems; vol. 6, No. 4; Dec. 1997; pp. 307-312.

Lequesne et al.; "High-Accuracy Magnetic Position Encoder Concept;" IEEE Transactions on Industry Applications; vol. 35, No. 3; May/Jun. 1999; pp. 568-576.

Melexis Microelectronic Systems, Hall Applications Guide, Section 3—Applications, 1997, 48 pages.

Notice of Allowance dated Feb. 3, 2012, U.S. Appl. No. 12/878,134, 7 pages.

Office Action dated Feb. 22, 2012, U.S. Appl. No. 13/241,380, 23 pages.

Office Action dated Jan. 17, 2012, U.S. Appl. No. 12/360,889, 13 pages.

Office Action dated Jul. 21, 2011, U.S. Appl. No. 12/360,889, 18 pages.

Office Action dated Jun. 7, 2012, U.S. Appl. No. 12/360,889, 9 pages.

Office Action dated May 10, 2012, U.S. Appl. No. 12/328,798, 17 pages.

Office Action dated Oct. 31, 2011, U.S. Appl. No. 12/328,798, 23 pages.

Oniku et al, "High-Energy-Density Permanent Micromagnets Formed From Heterogeneous Magnetic Powder Mixtures", Interdisciplinary Microsystems Group, Dept. of Electrical and Computer Engineering, University of Florida, Gainesville, FL 32611, USA; Preprint of MEMS 2012 Conf. Paper, 4 pages.

Park et al.; "Ferrite-Based Integrated Planar Inductors and Transformers Fabricated at Low Temperature;" IEEE Transactions on Magnetics; vol. 33, No. 5; Sep. 1997; pp. 3322-3324.

PCT Notification Concerning Transmittal of International Preliminary Report on Patentability (Chapter 1 of the Patent Cooperation Treaty), PCT/US2009/065044, dated Jun. 16, 2011, 8 pages.

PCT Notification Concerning Transmittal of International Preliminary Report on Patentability (Chapter 1 of the Patent Cooperation Treaty), PCT/US2008/053551, dated Oct. 8, 2009, 7 pages.

PCT Notification of Transmittal of the International Search Report and the Written Opinion of the International Searching authority, or the Declaration, PCT/US2008/053551, dated Jul. 15, 2008, 12 pages.

PCT Notification of Transmittal of the International Search Report and the Written Opinion of the International Searching authority, or the Declaration, PCT/US2006/000363, dated May 11, 2006, 14 pages.

PCT Notification of Transmittal of the International Search Report and the Written Opinion of the International Searching authority, or the Declaration, PCT/US2009/065044, dated Jan. 7, 2010, 12 pages.

Response to Office Action filed Feb. 28, 2012, U.S. Appl. No. 12/328,798, 14 pages.

Response to Office Action filed on Oct. 9, 2012, U.S. Appl. No. 12/328,798, 6 pages.

Response to Office Action filed on May 17, 2012, U.S. Appl. No. 12/360,889, 12 pages.

Response to Office Action filed on May 3, 2012, U.S. Appl. No. 13/241,380, 16 pages.

Response to Office Action filed on Sep. 27, 2012, U.S. Appl. No. 12/360,889, 11 pages.

Petrie; "Circular Vertical Hall Magnetic Field Sensing Element and Method with a Plurality of Continuous Output Signals;" U.S. Appl. No. 13/035,243, filed Feb. 25, 2011; 56 pages.

Office Action dated Aug. 26, 2013 from U.S. Appl. No. 13/165,156, 17 pages.

\* cited by examiner

METHODS AND APPARATUS FOR MAGNETIC SENSORS HAVING HIGHLY UNIFORM MAGNETIC FIELDS

BACKGROUND OF THE INVENTION

Planar Hall elements and vertical Hall elements are known types of magnetic field sensing elements that can be used in magnetic field sensors. A planar Hall element tends to be responsive to (i.e., have a major response axis aligned with) magnetic fields perpendicular to a surface of a substrate on which the planar Hall element is formed. A vertical Hall element tends to be responsive to (i.e., have a major response axis aligned with) magnetic fields parallel to a surface of a substrate on which the vertical Hall element is formed.

Other types of magnetic field sensing elements are known. For example, a so-called "circular vertical Hall" (CVH) sensing element, which includes a plurality of vertical magnetic field sensing elements, is known and described in PCT Patent Application No. PCT/EP2008/056517, entitled "Magnetic Field Sensor for Measuring Direction of a Magnetic Field in a Plane," filed May 28, 2008, and published in the English language as PCT Publication No. WO 2008/145662, which application and publication thereof are incorporated by reference herein in their entirety. The CVH sensing element is a circular arrangement of vertical Hall elements arranged over a common circular implant region in a substrate. The CVH sensing element can be used to sense a direction (and optionally a strength) of a magnetic field in a plane of the substrate. A CVH sensing elements tends to be responsive to (i.e., have a major response axis aligned with) magnetic fields parallel to a surface of the substrate on which the CVH sensing element is formed.

Various parameters characterize the performance of magnetic field sensing elements. These parameters include sensitivity, which is a change in an output signal of a magnetic field sensing element in response to a change of magnetic field experienced by the magnetic sensing element, and linearity, which is a degree to which the output signal of the magnetic field sensing element varies in direct proportion to the magnetic field. These parameters also include an offset, which is characterized by an output signal from the magnetic field sensing element not representative of a zero magnetic field when the magnetic field sensing element experiences a zero magnetic field.

As described above, the CVH sensing element is operable, with associated circuits, to provide an output signal representative of an angle of a direction of a magnetic field. Therefore, as described below, if a magnet is disposed upon or otherwise coupled to a so-called "target object," for example, a camshaft in an engine, the CVH sensing element can be used to provide an output signal representative of an angle of rotation, and/or a rotation speed, of the target object.

Other conventional magnetic field sensor arrangements position a magnetic field sensor and associated magnetic field sensing element along an axis of movement of a line magnet configured to move linearly, the line magnet coupled to a target object. In these arrangements, the magnetic field sensor is disposed such that the major response axis of the magnetic field sensing element within the magnetic field sensor is parallel to the axis of movement of the line magnet and, like the conventional arrangement described above, parallel to a major surface of the line magnet.

SUMMARY OF THE INVENTION

Exemplary embodiments of the invention provide methods and apparatus for sensors having elliptical magnets that have been magnetized along the major axis to generate substantially circular concentric zones of similar flux density. With this arrangement, a region in which a sensing element, for example, can be placed in relation to the elliptical magnet is increased as compared to a circular magnet that has been diametrically magnetized, which generates elliptical zones of flux density. In addition, less magnet material is needed for an elliptical magnet, as compared to a cylindrical magnet, to achieve comparable levels of angular position error. While exemplary embodiments of the invention are shown and described in conjunction with particular applications and configurations, it is understood that embodiments of the invention are applicable to magnetic applications in general in which circular concentric zones of similar flux density, less magnetic material, and/or greater offset tolerance are desirable.

In one aspect of the invention, a magnetic sensor comprises an elliptical magnet to generate circular concentric zones of similar flux density in a plane over and parallel to a surface of the magnet, a sensing element disposed a selected distance from the magnet, and a substrate containing circuitry to process a signal from the sensing element to provide a sensor output.

The sensor can further include one or more of the following features: a center of the concentric zones is aligned with a center of the magnet surface, a gradient of the flux density across the concentric zones is less than for a cylindrical magnet of the same volume, the sensor provides better accuracy than a magnetic sensor having a cylindrical magnet having the same volume as the elliptical magnet, the sensing element comprises a circular vertical hall (CVH) element, the elliptical magnet, a length to width ratio of the elliptical magnet is about 1.5, the elliptical magnet is not required to be keyed for orientation, the sensor senses angular position of a target, and/or the sensing element comprises at least one of a Hall element, an anisotropic magnetoresistance (AMR) element and/or a giant magnetoresistance (GMR) element.

In another aspect of the invention, a magnetic sensor comprises a circular vertical hall element, and an elliptical magnet to generate circular concentric zones of substantially similar flux density in a plane parallel to a surface of the magnet, wherein the circular hall element is located in relation to the magnet.

The sensor can further include one or more of the following features: a gradient of the flux density across the concentric zones is less than for a cylindrical magnet of the same volume, the sensor provides better accuracy than a magnetic sensor having a cylindrical magnet having the same volume as the elliptical magnet, a length to width ratio of the elliptical magnet is about 1.5, and/or the elliptical magnet is not keyed for orientation.

In other embodiments, the elliptical magnet is keyed for orientation. It is understood that an elliptical shape is not completely symmetric across x and y axes which is useful from a safety standpoint since if the adhesive that holds the magnet in the holder fails, the magnet continues to rotate with the shaft and continues to provide useful data if the magnet does not fall out of the system.

In a further aspect of the invention, a method comprises providing an elliptical magnet to generate concentric circular zones of similar flux density in a plane over and parallel to a surface of the magnet, providing a sensing element disposed a selected distance from the magnet, and providing a substrate containing circuitry to process a signal from the sensing element to provide a sensor output.

The method can further include one or more of the following features: a gradient of the flux density across the concentric zones is less than for a cylindrical magnet of the same volume, the sensor provides better accuracy than a magnetic sensor having a cylindrical magnet having the same volume as the elliptical magnet, the sensing element comprises a circular vertical hall element, and/or a length to width ratio of the elliptical magnet is about 1.5.

In a further aspect of the invention, a method comprises reducing an amount of material required to achieve a selected level of accuracy for a magnetic sensor as compared to a circular magnet by forming a magnet having an elliptical shape to generate circular concentric zones of substantially similar flux density in a plane parallel to a surface of the magnet.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
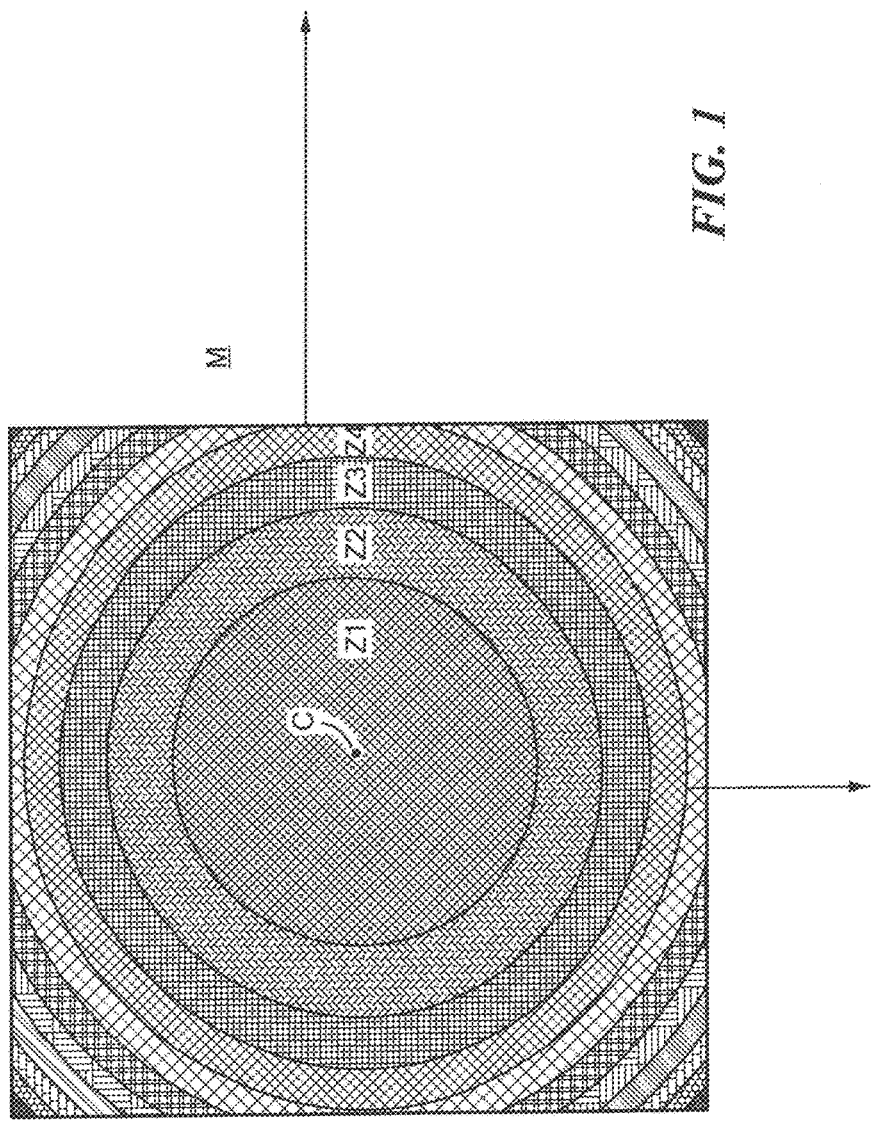
FIG. 1 is a schematic representation of concentric zones of similar flux density in a plane above an elliptical magnet.

Before describing exemplary embodiments of the invention, some introductory concepts and terminology are explained. As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall and some semiconductor based magnetoreistance elements tend to have axes of sensitivity perpendicular to a substrate, while anisotropic and giant magnetoresistance (AMR and GMR) elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic fields from regions of different magnetization of a ring magnet, and a magnetic field sensor that senses a magnetic field density of a magnetic field.

While a circular vertical Hall (CVH) magnetic field sensing element, which has a plurality of vertical Hall magnetic field sensing elements, is described in examples below, it should be appreciated that the same or similar techniques apply to any type of magnetic field sensing element and to any type of magnetic field sensor. In particular, techniques apply to one or more separate vertical Hall elements or separate magnetoresistance elements, not arranged in a CVH structure, and with or without associated electronic circuits.

In one aspect of the invention, a magnetic field sensor comprises a magnet with an elliptical shape to provide a highly uniform magnetic field in a plane parallel to the magnet surface. The magnetic field flux density comprises substantially circular concentric zones of substantially similar flux density. The benefits of a uniform magnetic field to reduce error levels in sensing applications will be readily apparent to one of ordinary skill in the art. In addition, a volume of magnetic material required for an elliptical magnet to produce a given accuracy level is less than for a comparable cylindrical magnet. While an elliptical magnet to generate a uniform magnetic field is well-suited for angle sensing applications that use a magnetic field to determine a position and/or direction of the target magnet, it is understood that embodiments of the invention are applicable to magnetic field sensing applications in general.

Figure 1A:
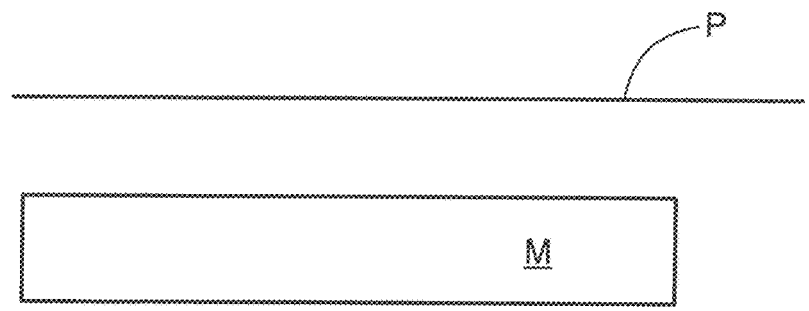
FIG. 1A shows the plane over an elliptical magnet.
Figure 1B:
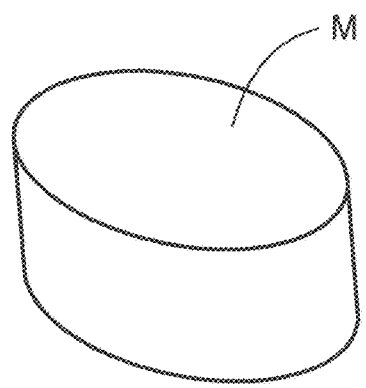
FIG. 1B is a plan view of an exemplary elliptical magnet.

FIGS. 1-1A show exemplary flux density over a portion of an elliptical magnet M in a plane P (FIG. 1A) parallel to the magnet surface in accordance with exemplary embodiments of the invention. As can be seen, the flux density forms a number of substantially circular zones Z1-4 where each zone is of substantially similar density. The zones Z1-4 are concentric circles about a center C of the magnet. For magnets that are generally symmetrical and uniformly magnetized, the center of the zones coincides with the center of the magnet. It is understood that any number of flux density zones can be generated depending on the size and material of the magnet.

In the illustrative flux density representation, the field is calculated by simulation for a 3 mm by 3 mm plane 1 mm from the surface of over the magnet, which is formed form a bonded NdFeB material (Br=0.60 T, Hc=440 KA/m, and Bhamx=70 KJ/m$^3$). The average field strength is about 560 G with a 30 G gradient from the center of the magnet surface to the edge of the 3 mm by 3 mm edge.

Figure 1C:
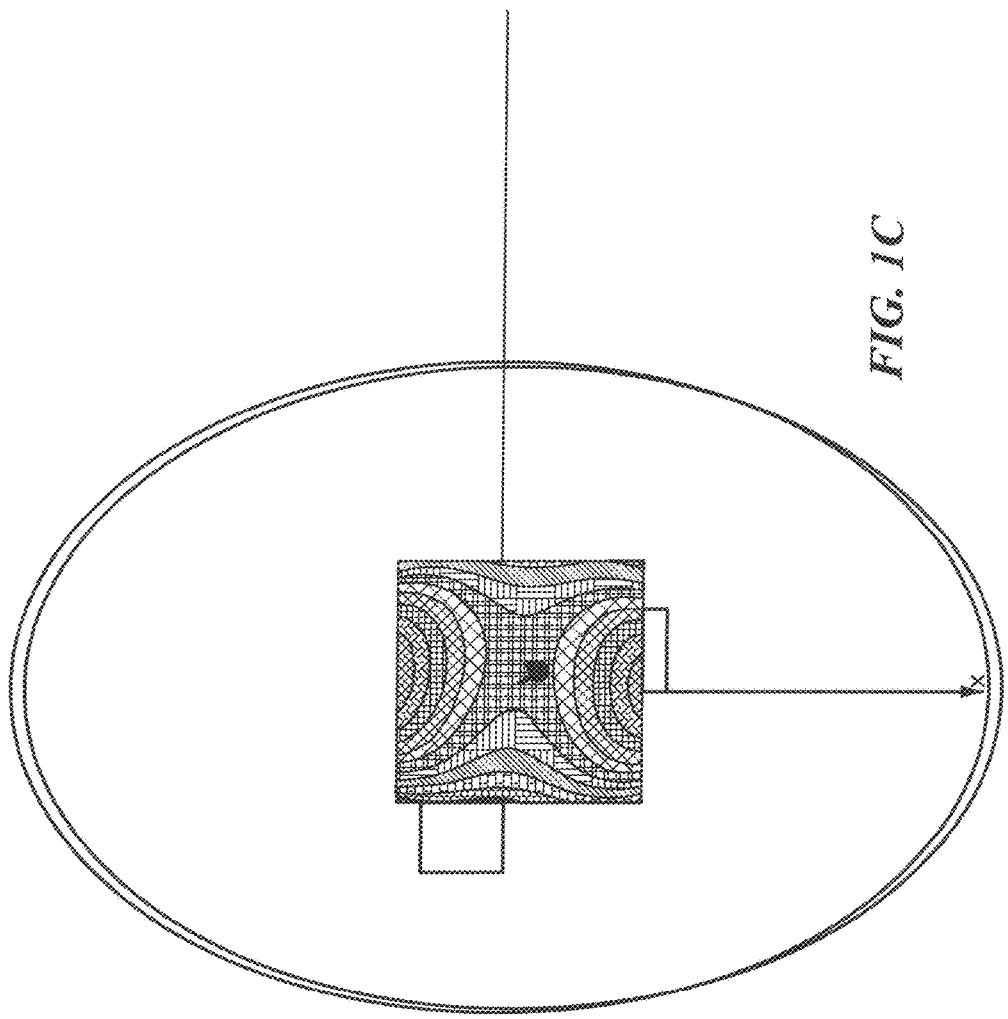
FIG. 1C is a schematic representation of flux density in a plane above an elliptical magnet.

FIG. 1C shows an elliptical magnet with cutout to retain the magnet within a holder for providing rotational friction/grip. It is understood that with inventive embodiments of an elliptical magnet, the shape orients itself and requires no cutouts. The elliptical shape of the magnet allows positioning without a cutout, which allows a more uniform magnetic field than may be achieved with some cutout geometries.

Figure 2:
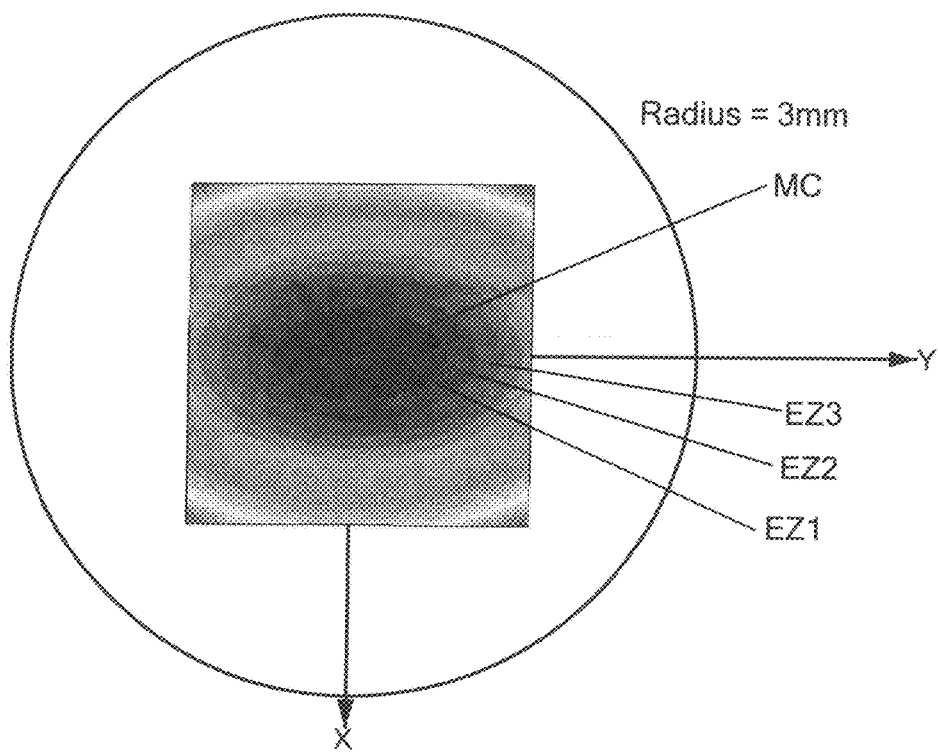
FIG. 2 is a schematic representation of elliptical zones of similar flux density in a plane above a prior art cylindrical magnet.
Figure 2A:
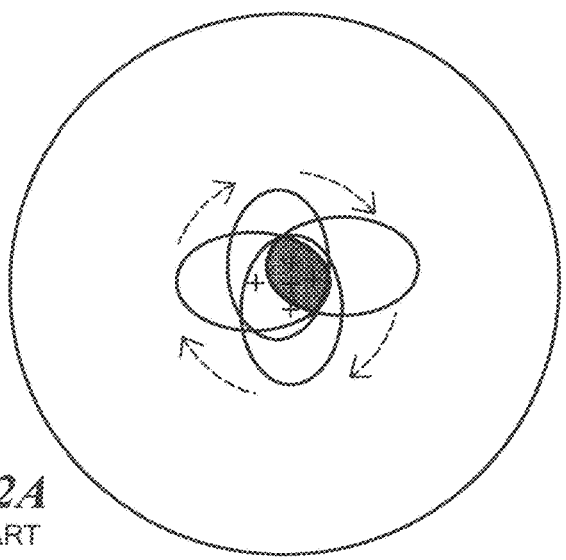
FIG. 2A is as schematic representation of an elliptical flux density zone rotations for a prior art cylindrical magnet.

As shown in FIG. 2, a conventional cylindrical magnet CM generates elliptical zones of flux density EZ at a plane above (or below) the magnet. The cylindrical magnet with no cutouts, will have non-uniform, oblong flux density zones centered on the magnet center MC. With no cutouts, the oblong flux density zones are centered on MC. With cutout (s), the center of the elliptical flux density zones is offset from the center MC of the magnet due to the asymmetry of the cutout. As can be seen in FIG. 2A, as the cylindrical magnet or sensing element near the magnet surface rotates, a given elliptical zone of similar flux density rotates with an offset about the center of magnet. Thus, the (shaded) area in which an element can be placed to remain in a given zone of similar flux density is reduced due to the rotation of the magnet or rotation of the element in relation to the cylindrical magnet. This limits the tolerance for a pick and place machine, for example, to place an element in relation to the cylindrical magnet.

In contrast, referring again to FIG. 1, an elliptical magnet M provides concentric circular zones Z1-N that have centers substantially aligned with the center of the magnet M. The circular zones allow the sensor to always have the same applied flux density. This increases the area of a region in which there is a zone of similar flux density in the face of rotation since the center of the similar flux density zones is substantially aligned with the magnet center.

Figure 3:
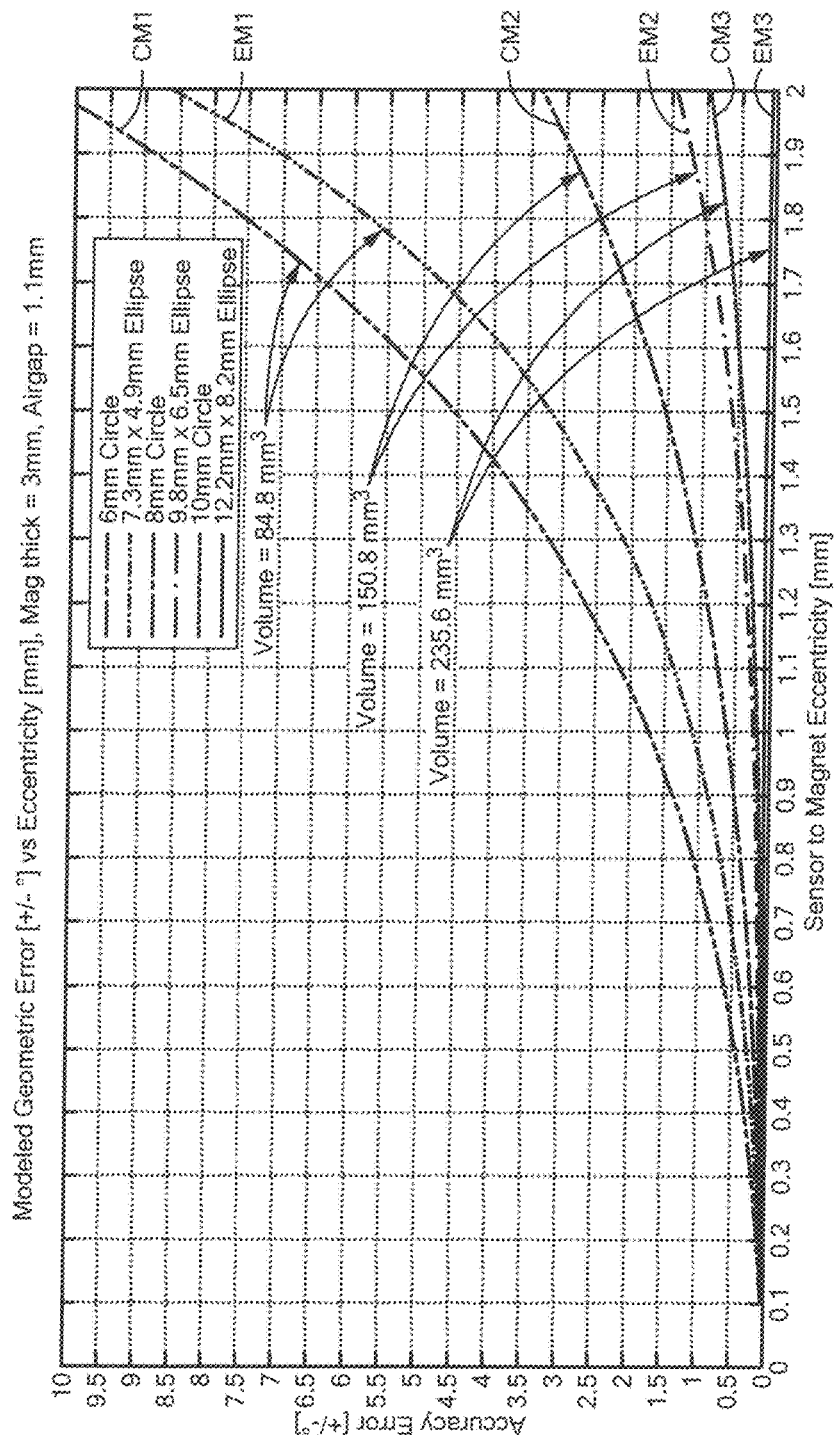
FIG. 3 is a graphical representation of accuracy error versus sensor magnet eccentricity for given volumes of elliptical and cylindrical magnets.

As shown in FIG. 3, an angle sensor having an elliptical magnet provides superior accuracy over cylindrical magnets for a given volume of magnet material. FIG. 3 is a graphical representation of accuracy error versus sensor magnet eccentricity for given volumes of elliptical and cylindrical magnets. Sensor to magnet eccentricity refers to the distance between the physical center of a magnet and the center of the sensing element. Perfect alignment (zero eccentricity) would be defined as a configuration where the center of the magnet is located on the same axis as the sensing element.

As can be seen, a first cylindrical magnet CM1 having a 6 mm diameter and a volume of 84.8 mm$^3$ has a greater accuracy error than a first elliptical magnet EM1 (7.3 mm by 4.9 mm) of the same volume. It is understood that accuracy errors refers to angular sensing error. For example, an absolute error of 3.6° of error out of 360° of rotation would be 1%. Angular error is determined by comparing the results of an angle measurement with the known physical position determined by external means, such as an encoder. For these illustrated accuracy plots, the sensor is oriented at the distance indicated on the graph in the X direction. Since the error is for a full rotation, the magnet, the error curve is the same for X displacement or Y displacement.

Similarly, a second cylindrical magnet CM2 has a greater accuracy error than a second elliptical magnet EM2 of the same volume and a third cylindrical magnet CM3 has a greater accuracy error that a third elliptical magnet EM3 of the same volume.

Figure 3A:
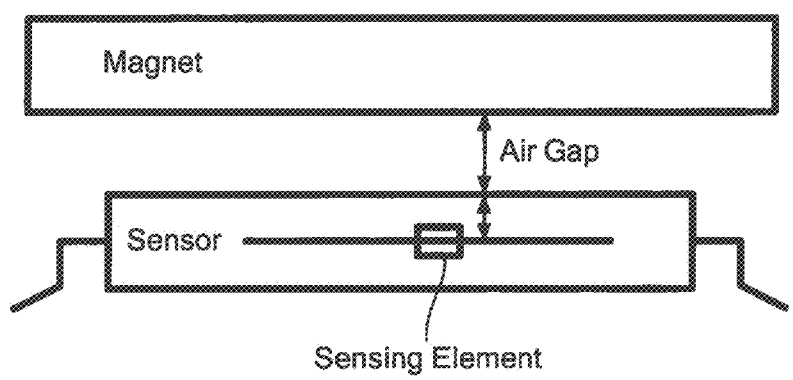
FIG. 3A shows an elliptical magnet having a planar surface with an airgap between the magnet planar surface and a surface of the IC package and a sensing element located a distance from the surface of the IC package.

FIG. 3A shows an elliptical magnet having a planar surface with an airgap between the magnet planar surface and a surface of the IC package and a sensing element located a distance from the surface of the IC package.

The benefits in reducing the volume of magnetic material to achieve a desired performance will be readily appreciated. The recent increases in the cost of magnetic materials is well known. In addition, an elliptical magnet achieves the same diameter of uniform field for a 360° rotation with less material than conventional magnets.

It is understood that the length to width ratio of the magnet shape can vary to meet the needs of a particular application. In one particular embodiment, the length to width ratio of about 1.5 provides the optimal field for achieving circular, concentric zones of similar flux density. It is understood that the magnet is magnetized along the longest dimension, or the major axis of the elipse. In general, the thickness of the magnet primarily influences the magnitude of the field.

It is understood that the eccentricity of the ellipse defining a shape of the magnet can vary to meet the needs of a particular application. In one embodiment, a magnet has a length of 9.8 mm, a width of 6.5 mm, for a length to width ratio of about 1.5, and a thickness of about 3 mm.

Exemplary applications for inventive elliptical magnets to generate zones of similar flux density will be readily apparent to one of ordinary skill in the art. One application is magnetic sensor devices, such as angle sensors that use magnets in conjunction with sensing elements, such as Hall elements to sense perturbations in a magnetic field.

Figure 4:
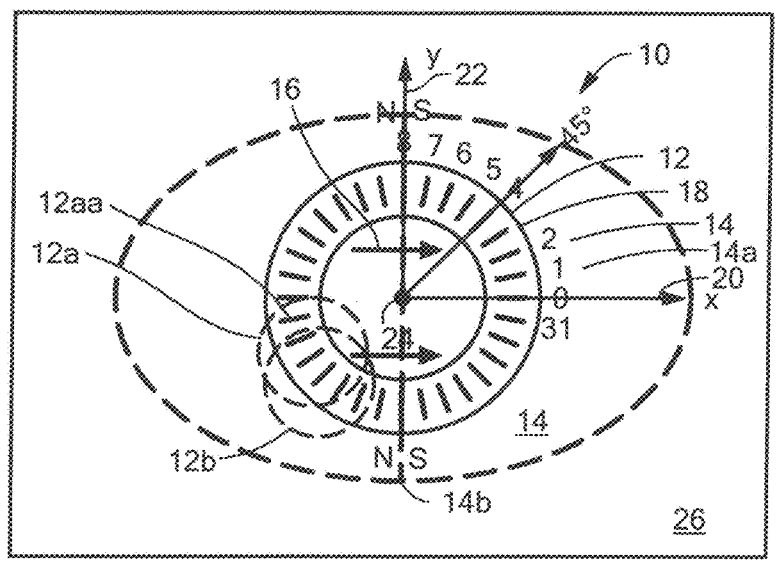
FIG. 4 is a schematic representation of a circular vertical hall element having an elliptical magnet.

FIG. 4 shows an exemplary circular vertical Hall (CVH) device 10 having an elliptical magnet 14 in accordance with exemplary embodiments of the invention. A circular vertical Hall (CVH) sensing element 12 includes a circular implant region 18 having a plurality of vertical Hall elements disposed thereon, of which a vertical Hall element 12a is but one example. Each vertical Hall element has a plurality of Hall element contacts (e.g., four or five contacts), of which a vertical Hall element contact 12aa is but one example.

A particular vertical Hall element (e.g., 12a) within the CVH sensing element 12, which, for example, can have five adjacent contacts, can share some, for example, four, of the five contacts with a next vertical Hall element (e.g., 12b). Thus, a next vertical Hall element can be shifted by one contact from a prior vertical Hall element. For such shifts by one contact, it will be understood that the number of vertical Hall elements is equal to the number of vertical Hall element contacts, e.g., 32. However, it will also be understood that a next vertical Hall element can be shifted by more than one contact from the prior vertical Hall element, in which case, there are fewer vertical Hall elements than there are vertical Hall element contacts in the CVH sensing element.

A center of a vertical Hall element 0 is positioned along an x-axis 20 and a center of vertical Hall element 8 is positioned along a y-axis 22. In the exemplary CVH 12, there are thirty-two vertical Hall elements and thirty-two vertical Hall element contacts. However, a CVH can have more than or fewer than thirty-two vertical Hall elements and more than or fewer than thirty-two vertical Hall element contacts.

In an exemplary embodiment, an elliptical magnet 14 has a south side 14a and a north side 14b disposed over the CVH 12. The magnet 14 tends to generate a magnetic field 16 having a direction from the north side 14a to the south side 14b. Other magnets having other shapes and configurations are possible.

In an exemplary embodiment, the elliptical magnet 14 is mechanically coupled to a rotating object (a target object), for example but not limited to, an automobile crank shaft or an automobile camshaft, a throttle position sensor, or the shaft of an electric motor, and is subject to rotation relative to the CVH sensing element 12. With this arrangement, the CVH sensing element 12 in combination with an electronic circuit described below can generate a signal related to the angle of rotation of the magnet 14.

Since the elliptical magnet 14 generates concentric regions of similar flux density centered about a center of the magnet it will be appreciated that the accuracy of the CVH device will be enhanced as compared to conventional devices having cylindrical magnets that generate elliptical flux density regions.

A center 24 of the CVH sensing element 12 is at a center of the entire CVH sensing element 12. Since the CVH sensing element 12 has very little depth (into the page), the center 24 can be considered to be on the surface of the substrate 26.

Figure 4A:
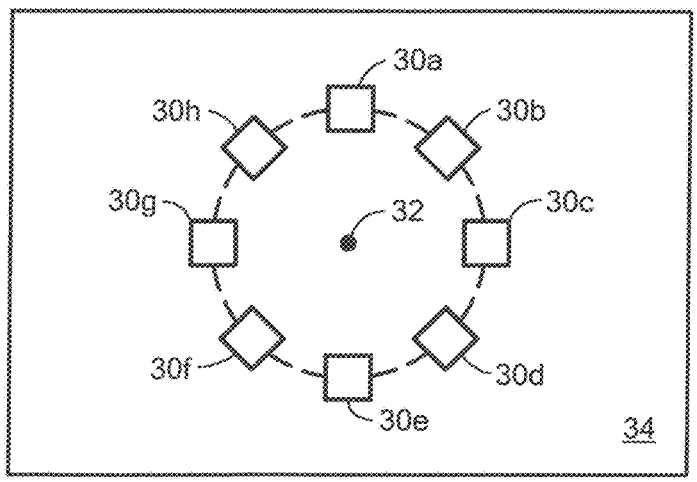
FIG. 4A is a schematic representation of a plurality of magnetic field sensing elements, for example, vertical Hall elements or magnetoresistance elements, upon a substrate.

Referring now to FIG. 4A, a plurality of magnetic field sensing elements 30a-30h (or alternatively, sensors), in a general case, can be any type of magnetic field sensing elements. The magnetic field sensing elements 30a-30h can be, for example, planar Hall elements, vertical Hall elements, or magnetoresistance elements. These elements can also be coupled to an electronic circuit described below. For embodiments where the sensing elements 30a-30h are vertical Hall elements or magnetoresistance elements, there can also be a magnet the same as or similar to the magnet 14 of FIG. 1, disposed proximate to the sensing elements 30a-30h in the same way as is shown in FIG. 4. The group of sensing elements 30a-30b can be disposed upon a substrate 34, for example, a silicon substrate, along with other electronics (not shown).

A center 32 of the plurality of magnetic field sensing elements 30a-30b is at a center of the entire group of magnetic field sensing elements 30a-30b. Since the magnetic field sensing elements 30a-30h have very little depth (into the page), the center 32 can be considered to be on the surface of the substrate 34.

Figure 5:
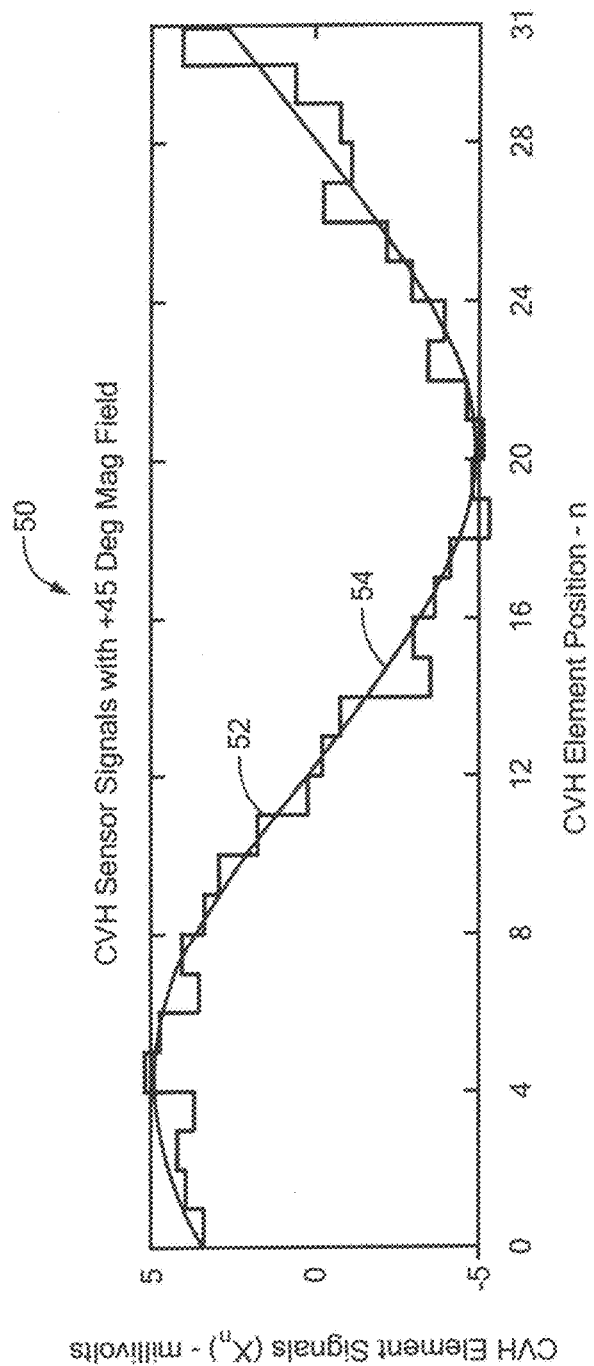
FIG. 5 is a graph showing an output signal that may be generated by a CVH sensing element having an elliptical magnet.

Referring now to FIG. 5, a graph 50 has a horizontal axis with a scale in units of CVH vertical Hall element position, n, around a CVH sensing element, for example, the CVH sensing element 12 of FIG. 4. The graph 50 also has a vertical axis with a scale in amplitude in units of millivolts. The graph 50 includes a signal 52 representative of output signal levels from the plurality of vertical Hall elements of the CVH taken sequentially with the magnetic field stationary and pointing in a direction of about forty-five degrees.

Referring briefly to FIG. 4, as described above, vertical Hall element 0 is centered along the x-axis 20 and vertical Hall element 8 is centered along the y-axis 22. In the exemplary CVH sensing element 12, there are thirty-two vertical Hall element contacts and a corresponding thirty-two vertical Hall elements, each vertical Hall element having a plurality of vertical Hall element contacts, for example, five contacts.

In FIG. 5, a maximum positive signal is achieved from a vertical Hall element centered at position 4, which is aligned with the magnetic field 16 of FIG. 4, such that a line drawn between the vertical Hall element contacts (e.g., five contacts) of the vertical Hall element at position 4 is perpendicular to the magnetic field. A maximum negative signal is achieved from a vertical Hall element centered at position 20, which is also aligned with the magnetic field 16 of FIG. 1, such that a line drawn between the vertical Hall element contacts (e.g., five contacts) of the vertical Hall element at position 20 is also perpendicular to the magnetic field. A sine wave 54 is provided to more clearly show the ideal behavior of the signal 52.

As will be appreciated, since the elliptical magnet has magnetic field that is more uniform than conventional circular magnets, the amount of error is reduced. In addition, due to the increased field uniformity the amount of flux density gradient over a given circular area of the elliptical magnet is decreased as compared to a cylindrical magnet.

Full operation of a CVH sensing element 12 of FIG. 4 and generation of the signal 52 of FIG. 5 are described in more detail in the above-described PCT Patent Application No. PCT/EP2008/056517, entitled "Magnetic Field Sensor for Measuring Direction of a Magnetic Field in a Plane," filed May 28, 2008, which is published in the English language as PCT Publication No. WO 2008/145662.

It will be understood that, using techniques described above in PCT Patent Application No. PCT/EP2008/056517, a phase of the signal 52 (e.g., a phase of the signal 54) can be found and can be used to identify the pointing direction of the magnetic field 16 of FIG. 1 relative to the CVH sensing element 12.

Exemplary embodiments of the invention comprise a magnetic sensor having an elliptical magnet to generate concentric zones of similar flux density in a plane above a surface of the magnet. Conventional cylindrical magnets generate elliptical zones of similar flux density. The inventive magnetic sensors having elliptical magnets have reduced accuracy error levels compared to cylindrical magnets of similar magnet volume. In addition less magnetic material is required for an elliptical magnet as compared to a cylindrical magnet to achieve a given accuracy level. It is understood that a variety of suitable magnet materials known to one of ordinary skill in the art can be used.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

What is claimed is:

1. A system, comprising:
    a magnet having a length, width, and height, wherein the magnet has a substantially planar surface that defines an ellipse across the length and width to generate substantially circular concentric zones of similar flux density in a plane over and parallel to the elliptical planar surface of the magnet, wherein the ellipse is noncircular; and
    a magnetic sensor IC package comprising:
        a sensing element disposed a selected distance from the planar surface of the magnet, wherein the planar surface of the magnet and a surface of the magnetic sensor IC package define an airgap with respect to rotation of the magnetic sensor IC package and/or magnet, wherein a center of the sensing element is substantially aligned with a center of the magnet; and
        a substrate containing circuitry to process a signal from the sensing element to provide an output of the magnetic sensor IC package.

2. The magnetic sensor IC package according to claim 1, wherein a center of the concentric zones is aligned with a center of the magnet surface.

3. The magnetic sensor IC package according to claim 1, wherein a gradient of the flux density across the concentric zones is less than for a cylindrical magnet of the same volume.

4. The magnetic sensor IC package according to claim 1, wherein the magnetic sensor IC package provides better accuracy than a magnetic sensor having a cylindrical magnet having the same volume as the elliptical magnet.

5. The magnetic sensor IC package according to claim 1, wherein the sensing element comprises a circular vertical hall element.

6. The magnetic sensor IC package according to claim 1, wherein a length to width ratio of the elliptical magnet surface is about 1.5.

7. The magnetic sensor IC package according to claim 1, wherein the elliptical magnet is not keyed for orientation.

8. The magnetic sensor IC package according to claim 1, wherein the magnetic sensor IC package senses angular position of a target.

9. The magnetic sensor IC package according to claim 1, wherein the sensing element comprises at least one of a Hall element, an anisotropic magnetoresistance (AMR) element and/or a giant magnetoresistance (GMR) element.

10. The magnetic sensor IC package according to claim 9, wherein the sensing element comprises a circular vertical hall element.

11. A system, comprising:
a magnet having a length, width, and height, wherein the magnet has a substantially planar surface that defines a noncircular ellipse to generate substantially circular concentric zones of substantially similar flux density in a plane parallel to the elliptical planar surface of the magnet; and
magnetic sensor IC package comprising
a circular implant region having a plurality of vertical Hall elements defining a center, wherein the Hall elements are located in a plane located a distance from the elliptical planar surface of the magnet, wherein the center of the vertical Hall elements is substantially aligned with a center of the elliptical planar surface of the magnet.

12. The magnetic sensor IC package according to claim 11, wherein a gradient of the flux density across the concentric zones is less than for a cylindrical magnet of the same volume.

13. The magnetic sensor IC package according to claim 11, wherein the sensor provides better accuracy than a magnetic sensor having a cylindrical magnet having the same volume as the elliptical magnet.

14. The magnetic sensor IC package according to claim 11, wherein a length to width ratio of the elliptical magnet is about 1.5.

15. The magnetic sensor IC package according to claim 11, wherein the elliptical magnet is not keyed for orientation.

* * * * *